United States Patent
Nicholson et al.

(10) Patent No.: US 12,346,138 B1
(45) Date of Patent: Jul. 1, 2025

(54) SYSTEMS AND METHODS FOR NON-DISRUPTIVE ESTIMATION AND CONTROL OF FLUID FLOW RATES

(71) Applicant: GE-HITACHI NUCLEAR ENERGY AMERICAS LLC, Wilmington, NC (US)

(72) Inventors: Jerry W. Nicholson, Leland, NC (US); Gregory A. Natsui, Niskayuna, NY (US); Giridhar Jothiprasad, Niskayuna, NY (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 76 days.

(21) Appl. No.: 18/405,882

(22) Filed: Jan. 5, 2024

(51) Int. Cl.
 *G05D 7/06* (2006.01)
 *G21C 17/032* (2006.01)

(52) U.S. Cl.
 CPC ......... *G05D 7/0623* (2013.01); *G05D 7/0676* (2013.01); *G21C 17/032* (2013.01); *Y10T 137/7761* (2015.04)

(58) Field of Classification Search
 CPC .............. G05D 7/0623; G05D 7/0676; G21C 17/032; Y10T 137/7761
 USPC .......................... 137/487.5; 700/282; 417/300
 See application file for complete search history.

(56) References Cited

U.S. PATENT DOCUMENTS

| | | | |
|---|---|---|---|
| 5,251,148 A * | 10/1993 | Haines | F16K 37/005 700/282 |
| 7,406,982 B2 * | 8/2008 | Pfaff | F15B 21/087 700/282 |
| 7,607,362 B1 | 10/2009 | Brost | |
| 9,507,351 B2 | 11/2016 | Kehoe et al. | |
| 10,591,175 B2 | 3/2020 | Karamanos et al. | |
| 11,220,967 B1 | 1/2022 | Poloni | |
| 11,485,486 B2 | 11/2022 | Sheng et al. | |
| 2006/0140758 A1 * | 6/2006 | Ochiai | F04D 29/30 415/206 |

(Continued)

FOREIGN PATENT DOCUMENTS

| CN | 1054484 | 9/1991 |
|---|---|---|
| CN | 201527284 | 7/2010 |

(Continued)

OTHER PUBLICATIONS

WIPO, International Search Report in corresponding PCT application PCT/US2025/010380, Apr. 22, 2025.

(Continued)

*Primary Examiner* — William M McCalister
(74) *Attorney, Agent, or Firm* — Alley IP

(57) ABSTRACT

Systems and methods provide flow rate measuring and control of drives, like fluid circulators, using non-disruptive sensors giving fluid pressures, temperature, density, pressure drop, etc. at or across the drive. Using these sensor outputs, drive operation, and a relationship of coefficients based on the same, the mass flow rate can be calculated. The sensors may be fully outside the conduit or at its inner surface on either side of the circulator with no other change. Fluid flow does not have to be redirected or interacted with, enhancing fluid flow efficiency and system life. Example systems can be installed on existing or new drives requiring only small conduit changes to verify or establish mass flow rates for drive operation.

20 Claims, 4 Drawing Sheets

(56) References Cited

U.S. PATENT DOCUMENTS

| | | |
|---|---|---|
| 2009/0089009 A1 | 4/2009 | Miller |
| 2010/0074728 A1* | 3/2010 | Sinzaki .................. F04D 29/66 |
| | | 415/119 |
| 2011/0154242 A1* | 6/2011 | Stevens .................... G01F 1/50 |
| | | 700/282 |
| 2016/0264028 A1* | 9/2016 | Kawashima .......... F04D 29/281 |
| 2020/0133314 A1* | 4/2020 | Zywiak .................. G05B 15/02 |
| 2022/0099466 A1 | 3/2022 | Patil et al. |

FOREIGN PATENT DOCUMENTS

| | | |
|---|---|---|
| JP | 2001-165741 | 6/2001 |
| JP | 2004-226192 | 8/2004 |

OTHER PUBLICATIONS

WIPO, Written Opinion in corresponding PCT application PCT/US2025/010380, Apr. 22, 2025.

\* cited by examiner

SYSTEMS AND METHODS FOR NON-DISRUPTIVE ESTIMATION AND CONTROL OF FLUID FLOW RATES

BACKGROUND

FIG. 1 is an illustration of a related art venturi tube used to measure fluid flow rate through a conduit. As shown in FIG. 1, a flow conduit 11 includes a narrowing section or neck 12 with a reduced cross-sectional area. As fluid in conduit 11 passes through neck 12, it will compress and/or increase speed and decrease pressure at neck 12 compared to the remainder of conduit 11. Assuming the fluid is relatively non-compressible, its speed, and thus flow rate, may be determined from the change in pressure exerted by the fluid at neck 12. To this end, two pressure sensors 13 and 14 may be positioned at the typical and narrowed cross-sections of conduit 11. The fluid pressure sensed by sensors 13 and 14 may be compared to find a delta, or change in pressure 15. Knowing the relative areas at neck 12 and conduit 11 allows calculation of the fluid volumetric flow rate by:

$$Q = A_2 \sqrt{\frac{2(p_1 - p_2)}{\rho\left(1 - \left[\frac{A_2}{A_1}\right]^2\right)}} \quad (1)$$

where $A_2$ is the area at neck 12, $A_1$ is the area of conduit 11, $p_1$ is the conduit pressure measured by sensor 13, $p_2$ is the neck pressure measured by sensor 14, and p is the fluid's density. Mass flow rate is determinable by multiplying the volumetric flow rate given by equation (1) by the fluid's density. Similar equations are known to determine mass flow rates of compressible fluids.

Other structures can be used to measure flow rate of the fluid based on pressure differences across an interruption. For example, FIG. 2 is an illustration of a related art orifice plate system 20. As shown in FIG. 2, drive 1, such as a pump, fan, injector, nozzle, etc. pushes fluid through conduit 2. Choke plate or orifice plate 18 is placed downstream on conduit 2 with pressure sensors 16 and 17 on opposite sides of plate 18. A pressure difference between sensors 16 and 17 is measured, and the difference is used to calculate the mass flow rate 21, similarly to the venturi tube. Mass flow rate 21 may instruct operators or an automated controller to change output pressure or flow rate from drive 1. Similarly, a bend in conduit 2 may be used to determine pressure drop between another pressure sensor 25 and pressure sensor 16, providing yet another mass flow rate. Many other flow-interrupting structures are known, including pilot tubes, flow nozzles, rotameters, laminar flow elements, etc. that may be used to calculate mass flow rate of the fluid interrupted thereby. U.S. Pat. No. 11,220,967 to Poloni, U.S. Pat. No. 9,507,351 to Kehoe et al., and US Pat Pub 2009/0089009 to Miller discuss related systems of measuring mass flow rate in flow conduits with flow-interrupting structures and are incorporated herein in their entireties by reference.

This background provides a useful baseline or starting point from which to better understand some example embodiments discussed below. Except for any clearly-identified third-party subject matter, likely separately submitted, this Background and any figures are by the Inventor(s), created for purposes of this application. Nothing in this application is necessarily known or represented as prior art.

SUMMARY

Example embodiments include measurement and/or control systems and methods for fluid circulators by using sensors that measure or allow derivation of fluid absolute pressure, temperature, density, pressure drop, etc. at or across the circulator. Using these sensor outputs, the circulator operations, and a known correspondence between mass flow rates and coefficients derived from these variables a mass flow rate can be determined without any change in conduit area or other interaction with the fluid. A pressure coefficient can be calculated from a pressure drop across the circulator divided by fluid density and circulator blade tip speed square, while a flow coefficient can be calculated as mass flow rate divided by the fluid density, area swept by the blade, and the blade tip speed. Experimenting across all mass flow rates, which may be separately measured, the determined coefficients can be reliably related. In this way, sensors that are external, or only at an outer perimeter of a constant-area flow conduit, can be used to determine mass flow rate with circulator operating speed and vane sizes. No flow change, interruption, or interaction is necessary, and the sensor systems can be installed in situ on existing circulators with minimal modifications.

BRIEF DESCRIPTIONS OF THE DRAWINGS

Example embodiments will become more apparent by describing, in detail, the attached drawings, wherein similar elements are represented by similar reference numerals. The drawings serve purposes of illustration only and thus do not limit example embodiments herein. Elements in these drawings may be to scale with one another and exactly depict shapes, positions, operations, and/or wording of example embodiments, or some or all elements may be out of scale or embellished to show alternative proportions and details.

DETAILED DESCRIPTION

Figure 1:
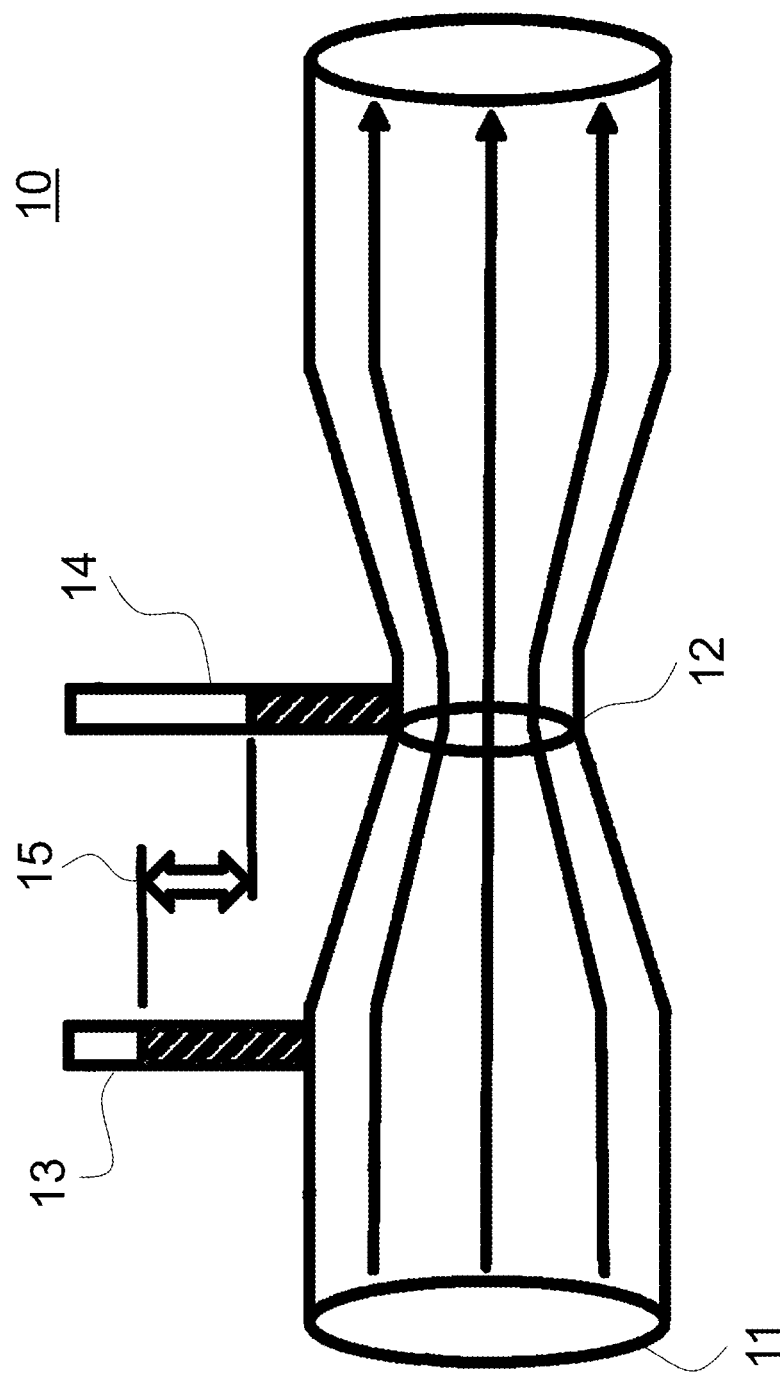
FIG. 1 is a schematic of a related art flow measurement system using a venturi tube having conduit surfaces and pressure gauges at differing conduit radii.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Membership terms like "comprises," "includes," "has," or "with" reflect the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude presence or addition of other subject matter in modified terms. The use of permissive terms like "may" or "can" reflect optionality such that modified terms are not necessarily present, but absence of permissive terms does not reflect compulsion. In listing items in example embodiments, conjunctions and inclusive terms like "and," "with," and "or" include all combinations of one or more of the listed items without exclusion of non-listed items. The use of "etc." is defined as "et cetera" and indicates the inclusion of all other elements belonging to the same group of the preceding items, in any "and/or" combination(s). Modifiers "first," "second," "another," etc. do not confine modified items to any order. These terms are used only to distinguish one element from another; where there are "second" or higher ordinals, there merely must be that many number of elements, without necessarily any difference or other relationship among those elements.

When an element is related, such as by being "connected," "coupled," "on," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.).

As used herein, singular forms like "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Relative terms such as "almost" or "more" and terms of degree such as "approximately" or "substantially" reflect 10% variance in modified values or, where understood by the skilled artisan in the technological context, the full range of imprecision that still achieves functionality of modified terms. Precision and non-variance are expressed by contrary terms like "exactly."

The structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations aside from exact operations described below. It should be presumed that any embodiment or method having features and functionality described below, in any workable combination, falls within the scope of example embodiments.

The inventors have recognized that while knowing mass flow rates of fluids in many industrial systems is critical, altering flow path and/or area of the conduit to achieve a pressure differential allowing measurement of fluid mass flow rate causes unwanted pressure drop. Even losses from small shunts or pilot tubes can accumulate throughout a fluid loop, requiring more energy and less efficiency in fluid movement. Such flow-disruptive measurement further requires a large amount of design and structure to be placed into the interior of a flow path during manufacture or retrofitting, increasing fabrication and installation costs. Moreover, because such interrupting structures necessarily come into heavy contact with the working fluid in the conduit, they are especially subject to chemical interaction with the fluid, mechanical erosion from the fluid, overheat from transfer from the fluid, and/or radioactive activation from the fluid. To overcome these newly-recognized problems as well as others, the inventors have developed example embodiments and methods described below to address these and other problems recognized by the inventors with unique solutions enabled by example embodiments.

The present invention is systems and methods for flow rate measurement with reduced flow interference. In contrast to the present invention, the few example embodiments and example methods discussed below illustrate just a subset of the variety of different configurations that can be used as and/or in connection with the present invention.

Figure 3:
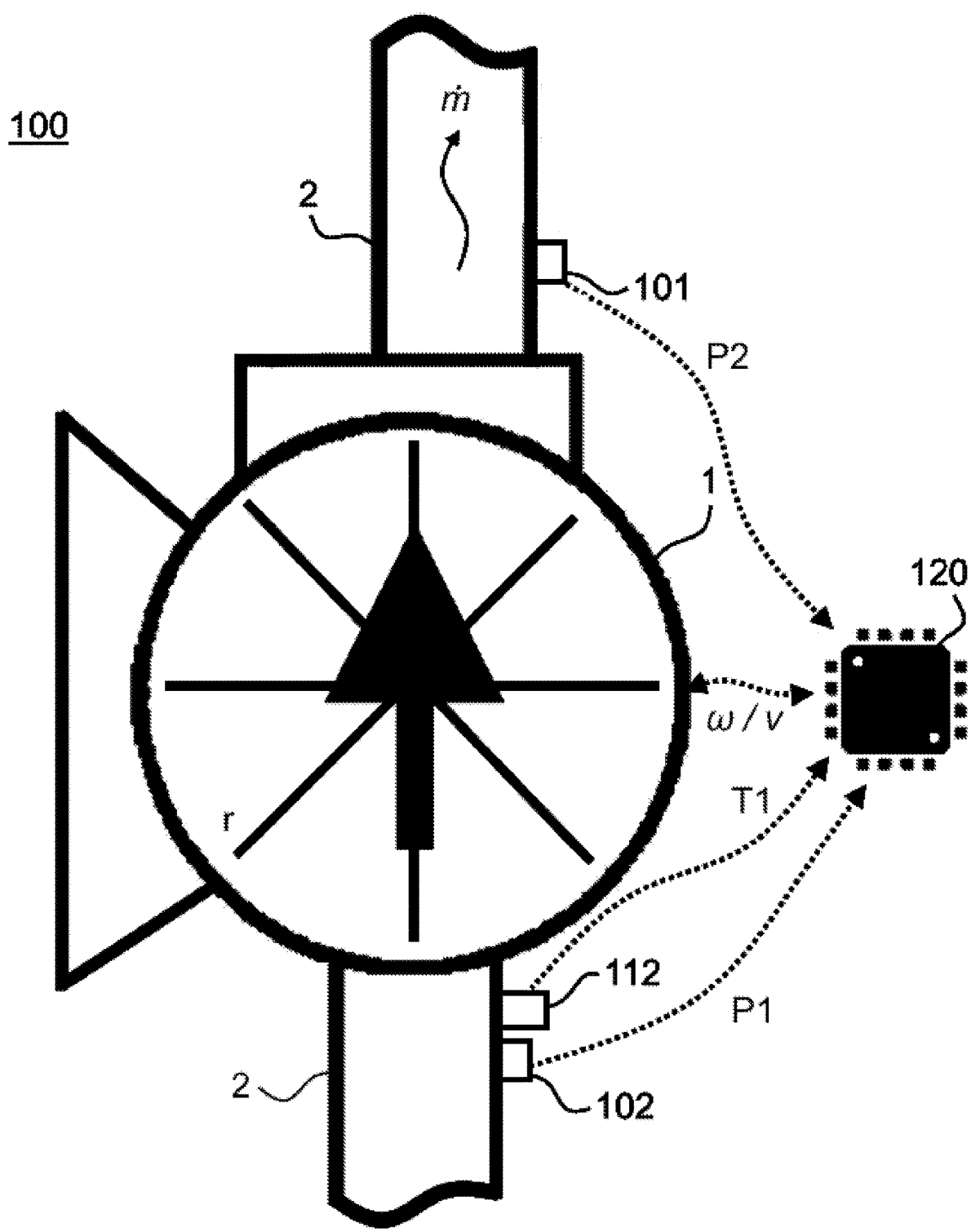
FIG. 3 is an illustration of an example embodiment non-interruptive flow instrumentation and control system.

FIG. 3 is a schematic of an example embodiment non-interruptive flow instrumentation and control system 100 that can operate to drive fluid at a determinable mass flow rate through a conduit. As shown in FIG. 3, drive 1 is enclosed to conduit 2, to move fluid through conduit 2. Drive 1 may be any blade- or vane-based rotational device that moves the working fluid by an angle-of-attack displacement of its rotating blades, such as a propellor, fan, blower, etc. The speed and size of these elements in drive 1 are known from installation and operation, including blade radius and rotational speed. The working fluid, drive 1, and conduit 2 can be implemented in any physical system, and examples of useable environments include cryogenic systems, heat treatment and drying plants, gas-cooled nuclear reactors, HVAC ducts connected to a furnace or heat pump fan driving ventilation, propellors and hubs surrounding the same driving a navigable fluid such as air or water, a loop in a power plant driving exhaust gas, steam, or a refrigerant coolant with a blower, a turbofan with vanes propelling a thrust fluid out of a jet engine or a compressed industrial gas to a container, etc. The working fluid may be any compressible or noncompressible fluid(s) in any single or mixed gas/liquid state(s), so long as pressure of the fluid can be measured and density or equivalent, such as via temperature and pressure for a gas, of the fluid can be obtained.

Example embodiment system 100 includes an inlet pressure sensor 102 and outlet pressure sensor 101 arranged at intake and exit points of drive 1. Sensors 101 and 102 are capable of measuring, directly or indirectly, absolute pressure of the fluid in conduit 2 on different sides of drive 1. For example, sensors 101 and 102 may be diaphragms in an internal perimeter of conduit 2, vibrating wires, strain gauges on conduit 2, etc. that do not reduce flow area of conduit 2 and may not even interrupt flow in conduit 2. With proper materials interfaced with an inner surface of conduit 2, even sensors 101 and 102 at that inner surface may produce no drag or disruption in the working fluid, potentially having Reynolds numbers better than the interior of conduit 2 itself. In this way, sensors 101 and 102, and system 100, may not disturb or redirect fluid flow in conduit 2, thus representing a negligible pressure drop for mass flow measurement.

Example embodiment system 100 may include an inlet temperature sensor 112 arranged at intake of drive 1. Sensor 112 may be capable of measuring, directly or indirectly, absolute temperature of the fluid in conduit 2 at an inlet of drive 1. For example, sensor 112 may be a thermocouple, resistance transducer, etc. with smooth surfaces that do not interrupt flow in conduit 2. Although sensors 101, 102, and 112 are shown as separate elements in FIG. 3, it is understood that a single device measuring pressure and temperature at the inlet and outlet locations may be used, with each measured value being individually reportable.

Sensors 101, 102, and 112 may have minimal interaction with any working fluid and thus may be resilient against the same. Nonetheless, sensors 101, 102, and 112 may use any materials compatible with the working fluid, drive 1, and conduit 2. For example, in an operating nuclear reactor environment, radiation-resilient materials that maintain their physical characteristics when exposed to high-temperature fluids, liquid metals, and radiation without substantially changing in physical properties, such as becoming substantially radioactive, melting, brittling, retaining/adsorbing radioactive particulates, etc. may be used. For example, ceramics or metals such as stainless steels and iron alloys, zirconium alloys, etc., including austenitic stainless steels 304 or 316, XM-19, Alloy 600, etc., are useable for various sensor components including those that may touch fluids at several hundred degrees Celsius. Similarly, direct connections between distinct parts and all other direct contact points may be lubricated, insulated, and/or fabricated of alternating or otherwise compatible materials to prevent seizing, fouling, metal-on-metal reactions, conductive heat loss, etc.

Figure 2:
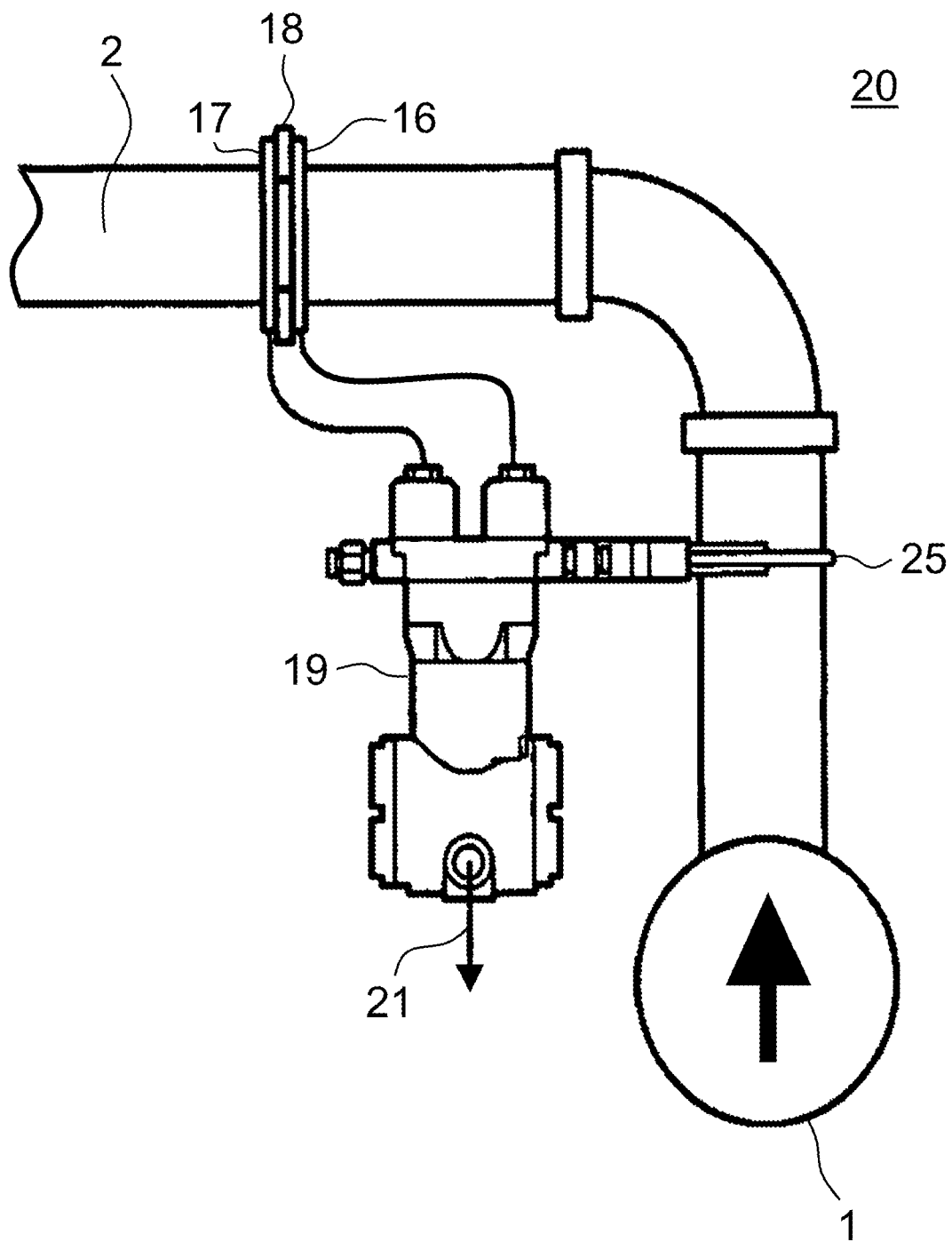
FIG. 2 is an illustration of a related art flow measurement system using an orifice plate(s) and/or pipe bend redirecting flow.

No other sensors and no extensions into conduit 2 to change flow area or flow direction are required in example embodiment system 100, unlike interruption-based flow meters like in FIGS. 1 and 2. Thus, no element of example embodiment system 100 may extend into conduit 2 beyond its inner surface; for example, all interfaces of sensors 101 and 102 may be at a same, maximum radial distance from an axis of flow of conduit 2. Further, because sensors 101, 102, and 112 may be relatively simple and not interfering with fluid flow in conduit 2, system 100 may be resilient and capable of measuring fluid flow rates even with challenging working fluids, such as radioactive or caustic fluids that cannot activate, react with, or erode example system components, with minimal complexity. No or minimal contact with the working fluid may provide relatively long operating life and allow easy installation and maintenance outside conduit 2.

Sensors 101, 102, and/or 112 report their measured or derived absolute pressure and temperature values, and drive 1 reports its speed, wirelessly or through a wired connection, to processor 120, including a digital computer, hardwired-circuit, firmware-based microprocessor, etc., configured to receive and interpret these inputs. Although a single processor 120 is shown receiving all output data, other divisions and/or omissions of structures and functionalities among any number of separate modules, processors, computers, servers, etc. are useable with example embodiment systems, including execution on a single machine or among distant, exclusive servers and processors. Example methods may be performed through proper computer programming or hardware configuring of networks and communications devices to receive inputs and act in accordance with example methods, at any number of different processor-based devices that are communicatively connected. Similarly, example methods may be embodied on non-transitory computer-readable media that directly instruct computer processors to execute example methods and/or, through installation in memory operable in conjunction with a processor and user interface, configure general-purpose computers having the same into specific communications machines that execute example methods. In this way processor 120 may be remote or local to the remainder of example embodiment system 100 and is configured with hardware and/or software, power, attendant memory, and/or user interface with the following example method of calculating the flow rate of the working fluid in conduit 2, shown in FIG. 4.

Figure 4:
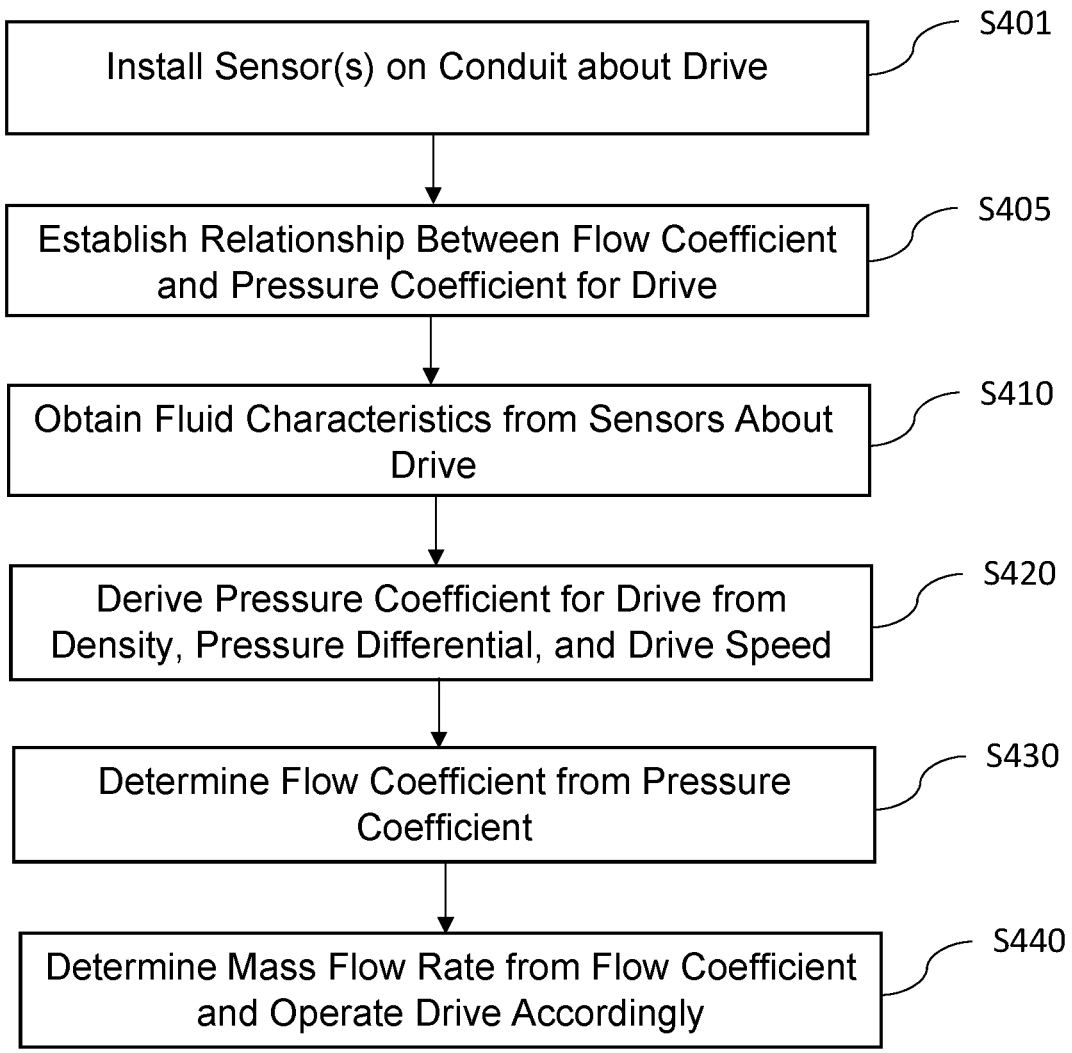
FIG. 4 is a flow chart illustrating an example method that may be used in example systems.

As seen in FIG. 4, in S410, processor 120 may calculate fluid density at an inlet of drive 1 for a gas as the working fluid by:

$$\varrho = (P_1 * M_f)/(R * T_1) \quad (2)$$

where $\varrho$ is fluid density, $P_1$ is absolute pressure of the fluid at the inlet/sensor 102, $M_f$ is the molar mass of the fluid, R is the ideal gas constant in corresponding units (e.g., 0.0821 L-atm/mol-K), and $T_1$ is the absolute temperature of the fluid at the inlet/sensor 112. Alternatively, a known density of the fluid may be used for a fluid having relatively constant density, or density of the fluid at the inlet may be measured and provided through another sensor.

In S420, processor 120 may calculate a pressure coefficient for drive 1 by:

$$k_P = \Delta P/(\varrho * v^2) \quad (3)$$

where $k_P$ is the pressure coefficient, $\Delta P$ is the absolute pressure difference between inlet and outlet pressure across the drive/the difference between sensor 101 and sensor 102, v is the velocity of a blade tip of drive 1 given by the radius of the blade r and angular velocity of drive 1, and $\varrho$ is given by equation (2) and/or independently known or measured. In the instance that vane radius is variable, an average vane length, or a longest vane length, may be used for radius r. Similarly, radius r may be selected from variable radii based on those values that give most reliable results. Other characteristics of drive 1, such as inlet guide vane geometry, vane number, density, angle of attack, material, channels, etc. do not need to be determined or sensed. However, where such characteristics may be variable, any relationship between $k_P$ and $k_f$ determined as discussed below may use the same characteristics in drive 1 to relate $k_P$ and $k_f$ for particular operating conditions.

The calculated pressure coefficient $k_P$ may be proportional to or directly associated with a flow coefficient $k_f$ for drive 1. The relationship may be determined experimentally or based on properties of drive 1. For example, in S405, drive 1 may be operated across its full range with given physical conditions, with mass flow rates ṁ being known or measured by another sensor, and each mass flow rate yields a mass flow coefficient $k_f$ by:

$$k_f = \dot{m}/(\varrho * \pi * r^2 * v) \quad (4)$$

where ṁ is the known mass flow rate, $\varrho$ is fluid density given by (2) or otherwise known, v is the velocity of a blade tip of drive 1, and r is the blade radius, or effective radius as discussed above. The value of the pressure coefficient $k_P$ may also be determined using S410-S420 for each $k_f$ calculated above in S405 under the same conditions, including same mass flow rate range and steps, same drive operating conditions such as inlet guide vane geometry, material, etc. The coefficients may be set together for each operating condition; for example, the relationship between $k_f$ and $k_P$ for each mass flow rate may be set out in a table with sufficient granularity to allow linear interpolation. Similarly, the relationship between the coefficients may be reduced to a formula through regression. For example, through regression of the coefficients, most drives 1 will yield a coefficient of determination ($R^2$) close to 1 with a $10^{th}$ order polynomial relating $k_f$ and $k_P$. This association and relationship determination in S405 may be conducted at any time, such as during manufacture of drive 1, at installation, or during operation.

With the relationship between the flow and pressure coefficients being established in S405, in S430, processor 120 may quickly determine the flow coefficient $k_f$ from the pressure coefficient $k_P$ given in S410-S420 from the outputs of sensors 101, 102, and 112 and drive 1 in example embodiment system 100, using equations (2) and (3). For example, processor 120 may select the matching $k_f$ from a table from a sensed $k_P$ for a given operating condition or may input the $k_P$ into a well-fit function for the condition to determine $k_f$.

Mass flow $\dot{m}$ rate may then be determined using the determined flow coefficient $k_f$ by rearranging equation (4) in S440 as such:

$$\dot{m} = k_f * \varrho * \pi * r^2 * v \qquad (5)$$

In S440, the determined mass flow rate may be used to verify other sensors determining mass flow rate or closely associated values, to change operation of drive 1, such as increasing its blade speed if too low a mass flow rate is calculated, or to give other operator feedback.

Example embodiment system 100 may be installed at any point in the lifetime of drive 1 and/or conduit 2 in S401. For example, because no flow area needs to be altered or even interrupted by sensors 101, 102, and 112, they may be installed on conduit 2 well after manufacturing and operation of drive 1 and conduit 2, such as by attaching a temperature sensor and strain gauges to conduit 2. Or, for example, minimal alteration of conduit 2, such as by drilling two small diagram holes in conduit 2, potentially even during operation, may allow sensors 101, 102, and 112 to reliably capture and report absolute pressure and temperature values of the fluid. Operational characteristics of drive 1 already known or reported by other systems may similarly be used by processor 120 in S410-S420.

Some example embodiments and methods thus being described, it will be appreciated by one skilled in the art that examples may be varied through routine experimentation and without further inventive activity. For example, although a single conduit with drive are used in some example methods, it is understood that other more complex flow scenarios are useable with example embodiments and methods. Variations are not to be regarded as departure from the spirit and scope of the example embodiments, and all such modifications as would be obvious to one skilled in the art are intended to be included within the scope of the following claims.

The invention claimed is:

1. A system for instrumentation and control of fluid flow with a drive through a conduit, the system comprising:
    a sensor system configured to measure fluid characteristics including a pressure of the fluid at an inlet of the drive and a pressure of the fluid at an outlet of the drive; and
    a processor receiving the fluid characteristics and a speed of the drive, wherein the processor is configured to calculate a mass flow rate of the fluid flow in the conduit using only the fluid characteristics, the speed of the drive, a density of the fluid, a blade size of the drive, and an established relationship between a flow coefficient and a pressure coefficient for the fluid flow with the drive, wherein the processor is configured to output the mass flow rate to an operator of the drive.

2. The system of claim 1, wherein the fluid is a gas, wherein the fluid characteristics further include a temperature of the fluid at the inlet, and wherein the processor is further configured to calculate the density of the fluid from the fluid characteristics, the molar mass of the fluid, and the ideal gas constant.

3. The system of claim 1, wherein the pressure coefficient is a difference divided by the density and a square of a speed of a fastest end of the blade, and wherein the difference is between the pressure of the fluid at the outlet and the pressure of the fluid at the inlet, and wherein the flow coefficient is the mass flow rate divided by the density, pi, the speed, and a square of a radius of the blade.

4. The system of claim 3, wherein the established relationship is a polynomial function expressing the flow coefficient in terms of the pressure coefficient developed empirically by operating the drive with known mass flow rates for set operating conditions.

5. The system of claim 1, wherein the sensor system includes a first pressure sensor before an inlet of the drive and a second pressure sensor after the outlet of the drive, and wherein the first and the second pressure sensor are a same distance from a central axis of flow of the conduit.

6. The system of claim 1, wherein the conduit has a substantially constant flow area at and around the sensor system.

7. The system of claim 1, further comprising:
    the drive, wherein the drive includes a plurality of the blades rotating so as to propel the fluid through the conduit; and
    the conduit, wherein the sensor system does not extend beyond an inner surface of the conduit toward an axis of flow of the conduit.

8. The system of claim 7, wherein the drive is a fan, and wherein the conduit is a gas coolant conduit in a nuclear power plant.

9. The system of claim 1, wherein no part of the system extends toward an axis of flow of the conduit beyond an inner surface of the conduit at its widest point.

10. A method of determining and controlling fluid flow with a drive through a conduit, the method comprising:
    receiving, at a processor from a sensor system associated with the conduit, fluid characteristics including a pressure of the fluid at an inlet of the drive and a pressure of the fluid at an outlet of the drive;
    receiving, at the processor from the drive, a speed of the drive;
    calculating, with the processor, a mass flow rate of the fluid flow in the conduit using only the fluid characteristics, the speed of the drive, the density of the fluid, a blade size of the drive, and an established relationship between a flow coefficient and a pressure coefficient for the fluid flow with the drive; and
    at least one of, changing the speed of the drive based on the mass flow rate, outputting the mass flow rate to an operator of the drive, and verifying output of another mass flow rate detector for the conduit is accurate.

11. The method of claim 10, wherein the fluid is a gas and the fluid characteristics further include a temperature of the fluid at the inlet, and wherein the method further comprises:
    calculating, with the processor, the density of the fluid from the fluid characteristics, the molar mass of the fluid, and the ideal gas constant.

12. The method of claim 10, wherein the pressure coefficient is a difference divided by the density and a square of a speed of a fastest end of the blade, and wherein the difference is between the pressure of the fluid at the outlet and the pressure of the fluid at the inlet, and wherein the flow coefficient is the mass flow rate divided by the density, pi, the speed, and a square of a radius of the blade.

13. The method of claim 10, wherein the established relationship is a polynomial function expressing the flow coefficient in terms of the pressure coefficient developed empirically.

14. The method of claim 10, wherein the sensor system includes a first pressure sensor before an inlet of the drive and a second pressure sensor after the outlet of the drive, and wherein the first and the second pressure sensor are a same distance from a central axis of flow of the conduit.

15. The method of claim 10, wherein the conduit has substantially constant flow area at and around the sensor system.

16. The method of claim 10, wherein the drive is a fan, and wherein the conduit is a gas coolant conduit in a nuclear power plant.

17. The method of claim 10, wherein no part of the sensor system extends toward an axis of flow of the conduit beyond an inner surface of the conduit at its widest point.

18. The method of claim 10, further comprising:
installing the sensor system on the conduit at the inlet and the outlet of the drive; and
communicatively connecting the processor to the sensor system and the drive.

19. A method of modifying a conduit about a drive to provide mass flow rate monitoring about the drive, the method comprising:
installing a sensor system on the conduit at an inlet and an outlet of the drive, wherein the sensor system is configured to measure fluid characteristics including a pressure of the fluid at the inlet of the drive and a pressure of the fluid at the outlet of the drive; and
communicatively connecting a processor to the sensor system and the drive, wherein the processor is configured to calculate a mass flow rate of the fluid flow in the conduit using only the fluid characteristics, the speed of the drive, a density of the fluid, a blade size of the drive, and an established relationship between a flow coefficient and a pressure coefficient for the fluid flow with the drive, wherein the processor is further configured to at least one of, change the speed of the drive based on the mass flow rate, output the mass flow rate to an operator of the drive, and verify an output of another mass flow rate detector for the conduit is accurate.

20. The method of claim 19, wherein the installing installs a first pressure sensor before an inlet of the drive and a second pressure sensor after an outlet of the drive, and wherein the first pressure sensor and the second pressure sensor do not extend inward past an inner surface of the conduit.

* * * * *